(12) United States Patent
Kasamatsu et al.

(10) Patent No.: US 9,190,647 B2
(45) Date of Patent: Nov. 17, 2015

(54) NONAQUEOUS ELECTROLYTE SECONDARY BATTERY WITH HIGH TEMPERATURE AND STORAGE CHARACTERISTICS

(75) Inventors: Shinji Kasamatsu, Osaka (JP); Hajime Nishino, Nara (JP); Hideharu Takezawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 271 days.

(21) Appl. No.: 11/795,265

(22) PCT Filed: Mar. 9, 2006

(86) PCT No.: PCT/JP2006/004597
§ 371 (c)(1),
(2), (4) Date: Jul. 13, 2007

(87) PCT Pub. No.: WO2006/098216
PCT Pub. Date: Sep. 21, 2006

(65) Prior Publication Data
US 2008/0160412 A1 Jul. 3, 2008

(30) Foreign Application Priority Data
Mar. 17, 2005 (JP) ................................. 2005-076817

(51) Int. Cl.
*H01M 2/16* (2006.01)
*H01M 4/485* (2010.01)
(Continued)

(52) U.S. Cl.
CPC .......... *H01M 2/1653* (2013.01); *H01M 2/1673* (2013.01); *H01M 2/1686* (2013.01);
(Continued)

(58) Field of Classification Search
CPC . H01M 2/1653; H01M 2/1686; H01M 4/485; H01M 4/525; H01M 4/505; H01M 10/0525; H01M 10/4235
USPC ............................ 429/231.3, 223, 224, 231.1
See application file for complete search history.

(56) References Cited

U.S. PATENT DOCUMENTS 4,728,473 A * 3/1988 Satoh et al. .................... 264/101
5,002,843 A * 3/1991 Cieslak et al. ................. 429/101
(Continued)

FOREIGN PATENT DOCUMENTS

| CN | 1324120 | 11/2001 |
|----|---------|---------|
| CN | 1340868 | 3/2002 |

(Continued)

OTHER PUBLICATIONS

Sun et al., Novel Refreshable N-Halamine Polymeric BiocidesA: N-Chlorination of Aromatic Polyamides, 2004, Ind. Eng. Chem. Res., 43, 5015-5020.*
(Continued)

Primary Examiner — Ula C Ruddock
Assistant Examiner — Lisa S Park
(74) Attorney, Agent, or Firm — McDermott Will Emery LLP (57) ABSTRACT

In the non-aqueous electrolyte secondary battery of the present invention, the separator includes a heat-resistant resin having chlorine atoms as an end group and the positive electrode active material includes a lithium-containing complex oxide containing aluminum atoms in its composition. Even if the chlorine atoms are liberated into the non-aqueous electrolyte, aluminum contained in the positive electrode active material is selectively leached into the non-aqueous electrolyte, thereby suppressing the leaching of other component elements. Consequently, there can be obtained a non-aqueous electrolyte secondary battery excellent in safety and high temperature storage characteristics.

11 Claims, 1 Drawing Sheet

(51) Int. Cl.
  *H01M 4/505* (2010.01)
  *H01M 4/525* (2010.01)
  *H01M 10/0525* (2010.01)
  *H01M 10/42* (2006.01)

(52) U.S. Cl.
  CPC .............. *H01M4/485* (2013.01); *H01M 4/505* (2013.01); *H01M 4/525* (2013.01); *H01M 10/0525* (2013.01); *H01M 10/4235* (2013.01); *Y02E 60/122* (2013.01)

(56) References Cited

U.S. PATENT DOCUMENTS

| | | | |
|---|---|---|---|
| 5,389,463 A * | 2/1995 | Chang et al. | 429/142 |
| 6,200,706 B1 * | 3/2001 | Ashida et al. | 429/249 |
| 6,379,842 B1 * | 4/2002 | Mayer | 429/231.3 |
| 6,805,996 B2 | 10/2004 | Hosoya | |
| 7,220,518 B2 * | 5/2007 | Omaru et al. | 429/314 |
| 7,511,112 B2 * | 3/2009 | Moriyama et al. | 528/86 |
| 2002/0037456 A1 | 3/2002 | Hosoya | |
| 2002/0055036 A1 * | 5/2002 | Shinohara et al. | 429/62 |
| 2004/0121236 A1 | 6/2004 | Shen et al. | |
| 2004/0191161 A1 | 9/2004 | Wang et al. | |
| 2004/0223906 A1 | 11/2004 | Wang et al. | |
| 2004/0258986 A1 | 12/2004 | Shen et al. | |
| 2005/0008563 A1 | 1/2005 | Naruoka | |
| 2005/0037263 A1 | 2/2005 | Wang et al. | |
| 2005/0048360 A1 | 3/2005 | Wang | |
| 2005/0048361 A1 | 3/2005 | Wang et al. | |
| 2005/0053545 A1 | 3/2005 | Liu et al. | |
| 2005/0084750 A1 | 4/2005 | Wang et al. | |
| 2005/0130042 A1 | 6/2005 | Liu et al. | |
| 2005/0175897 A1 * | 8/2005 | Jung et al. | 429/223 |
| 2006/0134525 A1 * | 6/2006 | Kleijnen et al. | 429/249 |
| 2007/0072083 A1 * | 3/2007 | Ikuta et al. | 429/246 |
| 2012/0308898 A1 * | 12/2012 | Sawamoto et al. | 429/249 |

FOREIGN PATENT DOCUMENTS

| | | |
|---|---|---|
| CN | 1551387 | 12/2004 |
| CN | 1581543 | 2/2005 |
| JP | 07-335228 | 12/1995 |
| JP | 8-222220 | 8/1996 |
| JP | 2000-030686 | 1/2000 |
| JP | 2000-223107 | 8/2000 |
| JP | 2001-266949 | 9/2001 |
| JP | 2002-198051 | 7/2002 |
| JP | 2002-231209 | 8/2002 |
| JP | 2003-017056 | 1/2003 |
| JP | 2003-040999 | 2/2003 |
| JP | 2004-031091 | 1/2004 |
| JP | 2004-363048 | 12/2004 |

OTHER PUBLICATIONS

Chinese Office Action, with partial English translation, issued in Chinese Patent Application No. CN 2006800036238 dated on Oct. 17, 2008.

Japanese Office Action issued in Japanese Patent Application No. JP 2006-065350 dated Nov. 10, 2011.

* cited by examiner

NONAQUEOUS ELECTROLYTE SECONDARY BATTERY WITH HIGH TEMPERATURE AND STORAGE CHARACTERISTICS

RELATED APPLICATIONS

This application is the U.S. National Phase under 35 U.S.C. §371 of International Application No. PCT/JP2006/304597, filed on Mar. 9, 2006, which in turn claims the benefit of Japanese Application No. 2005-076817, filed on Mar. 17, 2005, the disclosures of which Applications are incorporated by reference herein.

TECHNICAL FIELD

The present invention relates to non-aqueous electrolyte secondary batteries, and particularly relates to non-aqueous electrolyte secondary batteries with improved safety.

BACKGROUND ART

In recent years, there has been a rapid advancement in the development of portable and cordless consumer electronic devices. For power sources for driving these electronic devices, smaller and lighter batteries having a high energy density have been increasingly demanded. Among these, great expectations are placed on the growth of lithium ion secondary batteries as a power source for portable electronic equipment such as laptop computers, cellular phones and AV equipment because the lithium ion secondary batteries have a high voltage and a high energy density.

For a positive electrode active material of lithium ion second batteries, a lithium-containing composite oxide such as $LiCoO_2$, $LiNiO_2$, $LiMnO_2$, $LiMn_2O_4$ has been used. In such a positive electrode active material, destruction of crystal structure or cracking of particle occurs in association with expansion and contraction due to charge and discharge. Repeated charge and discharge cycles therefore result in reduction in capacity and increase in internal resistance.

In order to improve cycle characteristics and safety of batteries, for example, one proposal suggests replacing a part of Co or Ni included in a lithium-containing composite oxide with an element such as Mg to stabilize the crystal structure of the lithium-containing composite oxide (See Patent Document 1).

Among the positive electrode active materials as described above, $LiNiO_2$ has a large theoretical capacity; however, the reversibility of a change in crystal structure associated with charge and discharge is significantly decreased. In order to solve such a problem, another proposal suggests replacing a part of Ni with an element such as Co to mitigate the change in crystal structure (For example, see Patent Document 2).

Moreover, yet another proposal suggests replacing nickel and/or cobalt of a lithium-containing nickel cobalt oxide with inexpensive Mn to obtain $Li(NiMnCo)O_2$ and using this oxide as a positive electrode active material (For example, see Patent Document 3). As a result, a battery being inexpensive and excellent in performance can be obtained.

In many cases, for a separator for use in lithium ion secondary batteries, a porous film made of a thermoplastic resin such as polyolefin is used in view of the safety. This is because that such a separator has a so-called shut-down function. Herein, the shut-down function refers to a function in which when, for example, an external short circuit occurs and the battery temperature is abruptly increased in association with the occurrence of short circuit, the separator is softened and its micropores are closed, causing reduction in ion conductivity to stop the current from flowing.

However, even when the shut-down function is activated, if the battery temperature is further increased, a so-called meltdown occurs, in which the separator is molten and shrank by heat, causing a massive short circuit between the positive electrode and the negative electrode. On the other hand, another problem arises if the heat meltability of the separator is increased in order to improve the shut-down function. That is, the meltdown temperature of the separator is lowered.

In view of the above, for the purpose of improving both the shut-down performance and the meltdown resistance, there have been many proposals for a composite separator including a porous layer made of polyolefin and a layer made of a heat resistant resin. For example, there is a proposal for a separator obtained by laminating a layer composed of a heat resistant nitrogen-containing aromatic polymer such as aramid or polyamideimide and ceramic powder and a layer of porous film (For example, see Patent Document 4).

Patent Document 1: Japanese Patent Laid-Open Publication No. 2002-198051
Patent Document 2: Japanese Patent Publication No. 3,232,943
Patent Document 3: Japanese Patent Laid-Open Publication No. 2004-31091
Patent Document 4: Japanese Patent Publication No. 3,175,730

DISCLOSURE OF THE INVENTION

Problems to Be Solved by the Invention

When the heat resistant resin as described above is used, the safety of battery can be improved. However, a great reduction in capacity occurs during storage at a high temperature. Specifically, since aramid is obtained by polymerizing an organic matter including amine groups represented by paraphenylenediamine and an organic matter including chlorine groups represented by terephthaloyl chloride, the chlorine groups remain as an end group in the produced aramid. Likewise, since polyamideimide is obtained by causing reaction between trimellitic anhydride monochloride and diamine, the chlorine groups remain as an end group in the produced polyamideimide. The chlorine groups as such are liberated into an electrolyte under high temperature environment. On the other hand, in the positive electrode active material, main component elements (transition metals such as Co) in the positive electrode active material are readily leached under high temperature and high potential environment. When the liberated chlorine is present in the vicinity of the positive electrode active material, complexation reaction continuously occurs between a transition metal leached from the positive electrode active material and the chlorine. As a result, a large amount of component elements are leached into the electrolyte from the positive electrode active material, thereby reducing the site that functions as a positive electrode active material. Consequently, the battery capacity is presumably significantly reduced.

The present invention has been achieved in view of the problems as described above, and intends to provide a non-aqueous secondary battery excellent in safety and being capable of suppressing a reduction in capacity during storage at a high temperature.

Means for Solving the Problems

The present invention relates a non-aqueous electrolyte secondary battery comprising a positive electrode including a positive electrode active material, a negative electrode including a negative electrode active material, a non-aqueous electrolyte, and a separator, wherein the separator includes a heat resistant resin having chlorine atoms as an end group, and the positive electrode active material includes a lithium-containing composite oxide containing aluminum atoms in the composition thereof.

It is preferable that the above described heat resistant resin includes at least one selected from the group consisting of aramid and polyamideimide.

The above described separator may comprise a film including the heat resistant resin and a film including polyolefin laminated on the film including the heat resistant resin. Moreover, the separator may comprise a film including polyolefin and a layer including the heat resistant resin and a filler formed on the film including polyolefin.

It is preferable that the above described lithium-containing composite oxide is represented by a following formula:

$$Li_xM_{1-y}Al_yO_2 \tag{1}$$

where $1 \leq x \leq 1.05$, $0.001 \leq y \leq 0.2$, and M is at least one selected from the group consisting of Co, Ni, Mn and Mg.

Among the composite oxides represented by the formula (1), the above described lithium-containing composite oxide may be a composite oxide represented by a following formula:

$$Li_aCo_{1-b-c}Mg_bAl_cO_2 \tag{2}$$

where $1 \leq a \leq 1.05$, $0.005 \leq b \leq 0.1$, and $0.001 \leq c \leq 0.2$, or may be a composite oxide represented by a following formula:

$$Li_aNi_{1-b-c}Co_bAl_cO_2 \tag{3}$$

where $1 \leq a \leq 1.05$, $0.1 \leq b \leq 0.35$, and $0.001 \leq c \leq 0.2$, or may be a composite oxide represented by a following formula:

$$Li_aNi_{1-(b+c+d)}Mn_bCo_cAl_dO_2 \tag{4}$$

where $1 \leq a \leq 1.05$, $0.1 \leq b \leq 0.5$, $0.1 \leq c \leq 0.5$, $0.001 \leq d \leq 0.2$, and $0.2 \leq b+c+d \leq 0.75$.

EFFECT OF THE INVENTION

According to the present invention, during storage at a high temperature, even when the chlorine atoms are liberated from the heat resistant resin included in the separator into the non-aqueous electrolyte, the chlorine atoms preferentially react with aluminum included in the positive electrode active material, the other components of the positive electrode active material will not be leached from the positive electrode active material. As a result, it is possible to provide a non-aqueous electrolyte secondary battery with improved safety and favorable high temperature storage characteristics.

BEST MODE FOR CARRYING OUT THE INVENTION

A non-aqueous electrolyte secondary battery according to the present invention comprises a positive electrode including a positive electrode active material, a negative electrode including a negative electrode active material, a non-aqueous electrolyte, and a separator. The positive electrode active material includes a lithium-containing composite oxide containing aluminum atoms in the composition thereof. The separator includes a heat resistant resin having chlorine atoms as an end group.

In the present invention, the lithium-containing composite oxide as the positive electrode active material includes a predetermined amount of aluminum atoms. The stability constant of a complex composed of an aluminum atom and chlorine atoms is high compared with that of a complex composed of a main component element (for example, a transition metal such as C, Ni, and Mn) in the lithium-containing composite oxide and chlorine atoms. For this reason, aluminum atoms readily form complexes with chlorine atoms with preference. Therefore, during storage at a high temperature, even when the chlorine atoms as an end group are liberated in the non-aqueous electrolyte from the heat resistant resin included in the separator, the chlorine atoms preferentially react with aluminum atoms contained in the positive electrode active material to form complexes thereof. This accordingly makes it possible to suppress the component elements included in the positive electrode active material other than aluminum from being leached into the non-aqueous electrolyte, and thus to prevent a reduction in battery capacity during storage at a high temperature.

It is preferable that the heat resistant resin having chlorine atoms as an end group includes at least one selected from the group consisting of aramid and polyamideimide. This is because that aramid and polyamideimide are easily formed into a film since these are soluble in a polar organic solvent, and porous films made of these are extremely excellent in non-aqueous electrolyte retention capability and heat resistance.

Further, it is preferable that the glass transition point, the melting point and the thermal decomposition starting temperature that involves chemical change of the above described heat resistant resin are sufficiently high, and more specifically the mechanical strength under high temperatures thereof is high.

For example, the heat distortion temperature of the above described heat resistant resin in accordance with ASTM-D648 of American Society for Testing Materials, that is, the heat distortion temperature determined by a load deflection temperature measurement at 1.82 MPa is preferably 260° C. or more. The higher the heat distortion temperature is, the more surely the shape of the separator can be maintained even when the separator undergoes shrinkage by heat and the like. In the case where the heat distortion temperature is 260° C. or more, the separator can exert a sufficiently high thermostability even when the battery temperature is further increased (usually to approximately 180° C.) by accumulated heat during overheating of the battery.

It is preferable that the amount of chlorine included in the separator is 300 to 3000 μg per 1 g of the separator. The amount of chlorine included in a predetermined weight of the heat resistant resin is affected by the degree of polymerization of the heat resistant resin. In the case where the amount of chlorine is too small, the degree of polymerization of the heat resistant resin is too high, thus the flexibility thereof is reduced. This results in reduction in processability of the heat resistant resin. In the case where the amount of chlorine is great, the degree of polymerization of the heat resistant resin is small, thus the heat distortion temperature of the heat resistant resin is lowered. For this reason, it is conceivable that when the amount of chlorine falls within the above described range, the function of the heat resistant resin can be sufficiently exerted.

In the present invention, a porous film including the above described heat resistant resin may be used for the separator.

Further, for example, the separator may be a laminated film comprising a porous film including polyolefin such as polyethylene and polypropylene, and a porous film including the above described heat resistant resin. Furthermore, the separator may be a laminated matter comprising a porous film including polyolefin and a porous layer formed thereon that includes the above described heat resistant resin and a filler.

For example, the porous film including the above described heat resistant resin may be fabricated as follows.

First, the heat resistant resin is dissolved in a polar solvent such as N-methylpyrrolidone. The resultant solution is applied on a substrate such as a glass plate and a stainless plate, and then dried. The resultant porous film is peeled off from the substrate. In such a manner, the porous film including the above described heat resistant resin can be obtained.

The laminated film comprising a porous film including polyolefin and a porous film including the above described heat resistant resin may be fabricated by dissolving the above described heat resistant resin in a polar solvent, applying the resultant solution onto a porous film including polyolefin, and then drying.

The laminated matter comprising a porous film including polyolefin and a porous layer formed thereon that includes the above described heat resistant resin and a filler may be fabricated as follows.

The above described heat resistant resin is dissolved in a polar solvent, and a filler is added to the resultant solution. The mixture thus obtained is applied onto a porous film including polyolefin and then dried. In such a manner, the laminated matter comprising a porous film including polyolefin and a porous layer formed thereon that includes the above described heat resistant resin and a filler can be obtained.

It is preferable that the filler to be used is chemically stable and has a high purity so as not to adversely affect the battery performances even when impregnated with a non-aqueous electrolyte or exposed to a redox potential of the active material. Such a filler is exemplified by an inorganic oxide filler. Examples of the inorganic oxide filler include inorganic porous materials such as alumina, zeolite, silicon nitride, silicon carbide, titanium oxide, zirconium oxide, magnesium oxide, zinc oxide, and silicon dioxide.

Among those as described above, preferably used for the separator is the laminated matter comprising a porous film including polyolefin and a porous layer formed thereon that includes the above described heat resistant resin and a filler, because it is more excellent in heat resistance.

In the case where the separator is the laminated matter comprising a porous film including polyolefin and a porous layer that includes the heat resistant resin and a filler, the thickness of the porous layer including the heat resistant resin layer and a filler is not necessarily limited; however, the thickness is preferably 1 to 20 μm and more preferably 2 to 10 μm in view of a balance between the safety to be ensured by way of preventing the occurrence of internal short circuit and the battery capacity. When the thickness is less than 1 μm, the effect of the porous layer including the heat resistant resin and a filler that suppresses the heat shrinkage of the porous film including polyolefin under high temperature environment is reduced. When the thickness exceeds 20 μm, the porosity of the porous layer including the heat resistant resin and a filler becomes relatively low and thus the ion conductivity of the porous layer is reduced. This may increase the impedance and reduce the charge/discharge characteristics of the battery to some extent.

In view of securing the ion conductivity, the porosity of the porous layer including the heat resistant resin and a filler is preferably 20 to 70%. The porosity can be controlled by adjusting the application rate or the drying condition (the temperature or the airflow rate) of a mixture including the heat resistant resin and the filler, and the particle size or the shape of the filler.

In the case where the separator has the porous film including polyolefin and the porous layer formed thereon that includes the heat resistant resin and a filler, the total thickness of the separator is not necessarily limited; however, the thickness is preferably 5 to 35 μm, if the safety, the various battery characteristics and the battery design capacity are taken into consideration comprehensively.

The pore size of the micropores of the porous film including polyolefin is preferably 0.01 to 10 μm in view of obtaining both the ion conductivity and the mechanical strength.

In the case of the separator including the above described heat resistant resin, the thickness of the separator is preferably 5 to 20 μm and more preferably 10 to 20 μm in view of a balance between the safety to be ensured by way of preventing the occurrence of internal short circuit and the battery capacity. The porosity of the separator including the heat resistant resin is preferably 20 to 70%. The porosity of the separator can be controlled by adjusting the application rate or the drying condition of a solution including the heat resistant resin.

Next, descriptions will be made about lithium-containing composite oxides containing aluminum atoms in its composition.

As described above, in the present invention, a lithium-containing composite oxide containing a predetermined amount of aluminum is used so that when the chlorine atoms that remain in the heat resistant resin as an end group are liberated under high temperature and high potential environment, the chlorine atoms form complexes with aluminum atoms with preference.

Among the lithium-containing composite oxides as described above, usable is a lithium-containing composite oxide represented by a following formula:

$$Li_xM_{1-y}Al_yO_2 \qquad (1)$$

where $1 \le x \le 1.05$, $0.001 \le y \le 0.2$, and M is at least one selected from the group consisting of Co, Ni, Mn and Mg. The lithium-containing composite oxide represented by the formula (1) has a high capacity and is capable of absorbing and desorbing lithium ions even under high voltage.

The molar ratio x of the lithium is preferably $1 \le x \le 1.05$. When the molar ratio x of the lithium is less than 1, the amount of lithium salt in a raw material mixture for use in production of the lithium-containing composite oxide is small. This allows the presence of electrochemically inactive impurities such as cobalt oxide in the resultant product, causing a possibility that the battery capacity may be reduced. When the molar ratio x of the lithium exceeds 1.05, the excessive amount of lithium salt is present in the raw material mixture. This allows the lithium salt to remain in the product as an impurity, causing a possibility that the battery capacity may be reduced.

Herein, the molar ratio x of the lithium is a value obtained immediately after production of the lithium-containing composite oxide represented by the formula (1).

The molar ratio y of the aluminum is preferably $0.001 \le y \le 0.2$, and more preferably $0.005 \le y \le 0.2$. When the molar ratio y of the aluminum is less than 0.001, the above described effect may not be obtained sufficiently, causing a possibility that the effect for improvement may not be sufficiently expected. When the molar ratio y exceeds 0.2, the amount of metal atom M that contributes to charge/discharge reaction is reduced, causing a possibility that the battery capacity may be reduced.

A method for manufacturing the lithium-containing composite oxide represented by the formula (1) is not necessarily limited; however, it may be produced, for example, in a following manner.

At least one salt selected from the group consisting of a cobalt salt, a nickel salt, a manganese salt and a magnesium salt is mixed with a lithium salt and a magnesium salt at a predetermined ratio. The resultant raw material mixture is baked at a high temperature under an oxidizing atmosphere, whereby the lithium-containing composite oxide represented by the formula (1) can be obtained.

Among the lithium-containing composite oxides represented by the formula (1), usable is a lithium-containing composite oxide represented by a following formula:

$$Li_aCo_{1-b-c}Mg_bAl_cO_2 \quad (2)$$

where $1 \le a \le 1.05$, $0.005 \le b \le 0.1$, and $0.001 \le c \le 0.2$. The lithium-containing composite oxide represented by the formula (2) contains magnesium. Even when the positive electrode active material repeats expansion and contraction due to charge and discharge, the inclusion of the magnesium makes it possible to prevent distortion of the crystal lattice, structural destruction thereof or cracking of the particles of the active material. Because of this, reduction in discharge capacity is mitigated and cycle characteristics are improved.

The molar ratio b of the magnesium is preferably $0.005 \le b \le 0.1$. When the molar ratio b is less than 0.005, the above described effect may not be obtained. When the molar ratio b exceeds 0.1, the battery capacity may be reduced to some extent.

The molar ratio c of the aluminum is preferably $0.001 \le c \le 0.2$. When the molar ratio c is less than 0.001, the effect of Al is not sufficiently exerted. When the molar ratio c exceeds 0.2, the amount of metal atoms that contribute charge/discharge reaction becomes insufficient to some extent.

The preferable range of the molar ratio a of the lithium and the reason why the range is preferable is the same as that in the case of the lithium-containing composite oxide represented by the formula (1).

A method for manufacturing the lithium-containing composite oxide represented by the formula (2) is not necessarily limited; however, it may be produced, for example, in the following manner.

A lithium salt, a manganese salt, a cobalt salt, and an aluminum salt are mixed at a predetermined ratio. The resultant raw material mixture is baked at a high temperature under an oxidating atmosphere, whereby the lithium-containing composite oxide represented by the formula (2) can be obtained.

A composite salt including two or more elements selected from the group consisting of cobalt, magnesium and aluminum may be used in place of the salt of each element contained in the composite salt. For example, in place of the cobalt salt, the magnesium salt and the aluminum salt, a eutectic hydroxide containing cobalt, magnesium and aluminum or a eutectic oxide of these may be used.

Likewise, a lithium-containing composite oxide represented by a following formula may be used:

$$Li_aNi_{1-b-c}Co_bAl_cO_2 \quad (3)$$

where $1 \le a \le 1.05$, $0.1 \le b \le 0.35$, and $0.001 \le c \le 0.2$. It is known that a $LiNiO_2$-based material has a high capacity density, whereas a change in the crystalline structure associated with charge and discharge is large and the reversibility of the structural change is low. On the other hand, the lithium-containing composite oxide represented by the formula (3) further contains cobalt and aluminum in its composition. The presence of cobalt atoms or aluminum atoms in its crystalline structure, in particular in a lithium diffusion layer, makes it possible to suppress the contraction of the crystal lattice when the lithium is released from the composite oxide.

Moreover, the lithium-containing composite oxide represented by the formula (3) is inexpensive compared with the $LiCoO_2$-based material, and is particularly useful as a positive electrode material for use in a large size battery.

The molar ratio b of the cobalt is preferably $0.1 \le b \le 0.35$. When the molar ratio b is less than 0.1, the above describe effect is difficult to obtain. When the molar ratio b exceeds 0.35, the battery capacity is reduced to some extent.

The preferable range of molar ratio a of the lithium and the molar ratio c of the aluminum and the reason why these ranges are preferable are the same as those in the case of the lithium-containing composite oxide represented by the formula (1).

The lithium-containing composite oxide represented by the formula (3) may be produced, for example, in a following manner.

A nickel salt, a cobalt salt and an aluminum salt are dissolved in water at a predetermined mixing ratio. The resultant aqueous solution is subjected to neutralization process to be precipitated as a nickel-cobalt-aluminum ternary system composite hydroxide by coprecipitation. The resultant composite hydroxide and a lithium salt are mixed at a predetermined mixing ratio, and then the mixture is baked to give the lithium-containing composite oxide represented by the formula (3).

A composite salt containing two or more elements selected from the group consisting of nickel, cobalt and aluminum may be used in place of the salt of each element contained in the composite salt.

Moreover, a lithium-containing composite oxide represented by a following formula may be used:

$$Li_aNi_{1-(b+c+d)}Mn_bCo_cAl_dO_2 \quad (4)$$

where $1 \le a \le 1.05$, $0.1 \le b \le 0.5$, $0.1 \le c \le 0.5$, $0.001 \le d \le 0.2$, and $0.2 \le b+c+d \le 0.75$. The lithium-containing composite oxide represented by the formula (4) is inexpensive and is capable of maintaining stable battery performances.

The molar ratio b of the manganese is preferably $0.1 \le b \le 0.5$. When the molar ratio b is less than 0.1, the content of manganese in the composite oxide is small, making it difficult to achieve cost reduction. When the molar ratio b exceeds 0.5, the battery capacity is reduced to some extent.

The molar ratio c of the cobalt is preferably $0.1 \le c \le 0.5$. When the molar ratio c is less than 0.1, the crystal of the composite oxide becomes slightly unstable, causing a possibility that the cycle characteristics may be reduced or the safety of battery may be reduced to some extent. When the molar ratio c exceeds 0.5, the battery capacity is reduced to some extent.

For allowing various battery performances to be exerted while keeping them well-balanced, $0.2 \le b+c+d \le 0.75$ is preferable.

Preferable ranges of the molar ratio a of the lithium and the molar ratio d of the aluminum are the same as those in the case of the lithium-containing composite oxide represented by the formula (1).

The lithium-containing composite oxide represented by the formula (4) may be produced, for example, by mixing a lithium salt, a nickel salt, a cobalt salt, a manganese salt, an aluminum salt and the like at a predetermined mixing ratio, and then baking the resultant mixture at a high temperature under an oxidizing atmosphere.

Similarly as described above, a composite salt containing two or more elements selected from the group consisting of nickel, cobalt, manganese, and aluminum may be used in place of the salt of each element contained in the composite salt. For example, in place of the nickel salt, the cobalt salt, the manganese salt and the aluminum salt, a eutectic hydroxide containing cobalt, magnesium, manganese and aluminum, and a eutectic oxide of these may be used.

For the lithium salt to be used for synthesis of the above described lithium-containing composite oxide, for example, lithium carbonate, lithium hydroxide, lithium nitrate, lithium sulfate and lithium oxide may be used.

For the magnesium salt, for example, magnesium oxide, basic magnesium carbonate, magnesium chloride, magnesium fluoride, magnesium nitrate, magnesium sulfate, magnesium acetate, magnesium oxalate, magnesium sulfide and magnesium hydroxide may be used.

For the cobalt salt, for example, cobalt oxide and cobalt hydroxide may be used.

For the aluminum salt, for example, aluminum hydroxide, aluminum nitrate, aluminum oxide, aluminum fluoride and aluminum sulfate may be used.

For the nickel salt, for example, nickel oxide and nickel hydroxide may be used.

For the manganese salt, for example, manganese oxide, manganese hydroxide, manganese carbonate, manganese nitrate, manganese sulfate, manganese fluoride, manganese chloride and manganese oxyhydroxide may be used.

In the lithium-containing composite oxide represented by the formula (1), the effect of the present invention can be obtained when the composite oxide included therein is used singly or when used in combination of two or more. For example, a mixture that includes two or more of the lithium-containing composite oxides represented by the formulae (1) to (4) may be used for the positive electrode active material.

In the case of a mixture of lithium-containing composite oxides that does not include aluminum atoms in its composition, for example, a mixture of $Li_aCO_{1-b}O_2$ and $Li_aNi_{1-(b+c)}Mn_bCO_cO_2$ is used for the positive electrode active material, the potential of each composite oxide in a charged state is determined on the basis of the valences of the transition metals included therein. In these two composite oxides, since the transition metals included therein differ in kind, the potentials of the composite oxides are different from each other. Thus, in the mixture, the potential distribution is easily varied. Therefore, there is a possibility that main component elements (transition metals such as Co) in the positive electrode active material are readily leached in the non-aqueous electrolyte when the chlorine atoms contained in the heat resistant resin as an end group are liberated. Furthermore, in the case where the charge voltage is high, the transition metals contained in the positive electrode active material are readily oxidized under high voltage environment, and in particular, main component elements (transition metals such as Co) are readily leached.

In contrast, since the lithium-containing composite oxide used in the present invention includes Al, even if the chlorine atoms contained in the heat resistant resin are liberated into the non-aqueous electrolyte, Al is selectively leached from the composite oxide of the positive electrode, thereby suppressing the leaching of other main component elements. As a result, it is possible to obtain a battery excellent in safety, in which the reduction in capacity during storage at a high temperature is suppressed.

Next, descriptions will be made about the positive electrode, the negative electrode and the non-aqueous electrolyte.

The positive electrode, for example, may include a positive electrode current collector and a positive electrode material mixture layer carried thereon.

The positive electrode material mixture layer includes a positive electrode active material, a conductive agent, a binder and the like. As described above, the positive electrode active material includes a lithium-containing composite oxide containing aluminum atoms in its composition.

For the binder to be used for the positive electrode, for example, polytetrafluoroethylene; modified acrylonitrile rubber particles (for example, BM-500B available from Zeon Corporation, Japan); and polyvinylidene fluoride and a modified substance thereof having both bonding property and thickening property may be used. These may be used singly or in combination of two or more.

The above described polytetrafluoroethylene and modified acrylonitrile rubber particles may be used in combination with carboxymethyl cellulose, polyethylene oxide or soluble modified acrylonitrile rubber (for example, BM-720H available from Zeon Corporation, Japan), those having a thickening effect.

For the conductive agent, acetylene black, Ketjen Black or various graphites may be used. These may be used singly or in combination of two or more.

As is the case with the positive electrode, the negative electrode may include a negative electrode current collector and a negative electrode material mixture layer carried thereon. The negative electrode material mixture layer includes a negative electrode active material. The negative electrode material mixture layer may include a binder, a conductive agent and the like as needed.

For the negative electrode active material, a lithium metal; a material capable of forming an alloy with lithium; various natural graphites and artificial graphites; a silicon-based composite material such as silicide; a lithium alloy including at least one element selected from the group consisting of tin, aluminum, zinc and magnesium; and various alloy materials may be used. These are used singly or in combination of two or more.

In view of improving the capacity, preferably used among the above materials for the negative electrode active material is at least one selected from the group consisting of the material capable of forming an alloy with lithium, the lithium metal and the lithium alloy as described above.

The material capable of forming an alloy with lithium is exemplified by a simple substance of silicon, an oxide of silicon (for example, $SiO_x$ (0<x<2)), a simple substance of tin, an oxide of tin (for example, SnO) and Ti.

The negative electrode material mixture layer may be formed by vapor-depositing the negative electrode active material directly onto the current collector. Alternatively, the negative electrode material mixture layer may be formed by applying a material mixture containing the negative electrode active material and a small amount of arbitrary component onto the current collector and then drying.

For the binder to be used for the negative electrode, similarly to the case of the positive electrode, various resin materials including polyvinylidene fluoride and a modified substance thereof may be used.

Among these, in view of improving the safety against overcharging, it is more preferable to use, for example, a mixture of a water-soluble binder containing styrene-butadiene copolymer or a modified substance thereof and cellulose based resin such as carboxymethyl cellulose.

The non-aqueous electrolyte includes a non-aqueous solvent and a solute dissolved therein. For the non-aqueous solvent, a solvent generally used in the art may be used. Examples of such a solvent include ethylene carbonate, dimethyl carbonate, diethyl carbonate and ethyl methyl carbonate. These are used singly or in combination of two or more.

For the solute, a lithium salt generally used in the art may be used. Examples of such a lithium salt include $LiPF_6$ and $LiBF_4$. These lithium salts may be used singly or in combination of two or more.

In order to form a favorable coating film on the positive and negative electrodes, the non-aqueous electrolyte may further contain, for example, vinylene carbonate, cyclohexylbenzene and/or a modified substance thereof.

In the following, the present invention will be described specifically in accordance with Examples, but the present invention is not limited to these Examples.

EXAMPLE 1

EXAMPLE 1-1

(a) Fabrication of a Positive Electrode

An aqueous solution including cobalt sulfate at a concentration of 0.999 mol/L and aluminum sulfate at a concentration of 0.001 mol/L was continuously supplied into a reaction bath. Sodium hydroxide was dropped into the reaction bath until the pH of the aqueous solution becomes 10 to 13, whereby $Co_{0.999}Al_{0.001}(OH)_2$ was synthesized. Thereafter, the resultant hydroxide was sufficiently washed with water and then dried to give a precursor of a positive electrode active material.

The precursor thus obtained and lithium carbonate were mixed so that the molar ratio of the lithium, the cobalt and the aluminum became 1.02:0.999:0.001. The resultant mixture were pre-baked at 600° C. for 10 hours and then crushed. Subsequently, the crushed baked material was baked again at 900° C. for 10 hours and then crushed and classified to give a lithium-containing composite oxide represented by a formula $Li_{1.02}Co_{0.999}Al_{0.001}O_2$. The resultant lithium-containing composite oxide was referred to as a positive electrode active material 1-1.

3 kg of the positive electrode active material thus obtained, 1 kg of an N-methyl-pyrrolidone (hereinafter referred to as NMP) solution containing 12 wt % of polyvinylidene fluoride as a positive electrode binder (#1320 (trade name) available from Kureha Chemical Industry Co., Ltd.), 90 g of acetylene black as a conductive agent, and an appropriate amount of NMP were stirred with a double arm kneader to prepare a positive electrode material mixture paint.

This paint was applied onto both faces of a 15 μm thick aluminum foil serving as a positive electrode current collector. At this time, the above described paint was not applied to a positive electrode lead connecting portion.

Next, the paint thus applied was dried and then rolled with a roller to form a positive electrode material mixture layer with an active material density (the weight of active material/the volume of material mixture layer) of 3.3 g/cm³. The total thickness of the positive electrode current collector and the positive electrode material mixture layers was 160 μm.

Thereafter, the precursor for the electrode plate thus obtained was slit to a width such that it could be inserted in a battery case for a cylindrical battery (diameter: 18 mm and length: 65 mm), whereby a positive electrode plate was obtained.

(b) Fabrication of a Negative Electrode 3 kg of artificial graphite as a negative electrode active material, 75 g of an aqueous dispersion containing 40 wt % of a modified substance of a styrene-butadiene copolymer ("BM-400B (trade name)" available from Zeon Corporation, Japan) as a negative electrode binder, 30 g of carboxymethyl cellulose as a thickener and a proper amount of water were stirred with a double arm kneader to prepare a negative electrode material mixture paint. The paint thus obtained was applied onto both faces of a 10 μm thick copper foil serving as a negative electrode current collector. At this time, this paint was not applied to a negative electrode lead connecting portion.

Next, the paint thus applied was dried and then rolled with a roller to form a negative electrode material mixture layer with an active material density of 1.4 g/cm³. The total thickness of the cupper foil and the negative electrode material mixture layers was 180 μm.

Thereafter, the precursor for the electrode plate thus obtained was slit to a width such that it could be inserted in a battery case for the cylindrical battery as described above, whereby a negative electrode plate was obtained.

(c) Fabrication of a Separator

A laminated film comprising a 16 μm thick porous thin film made of polyethylene (PE) and a film made of aramid resin that was a heat resistant resin was fabricated. This laminated film was used as the separator.

A method of fabricating the above described laminated film will be described below.

To 100 parts by weight of NMP, 6.5 parts by weight of dry anhydrous calcium chloride was added. The resultant mixture was warmed to 80° C. in a reaction bath, so that the anhydrous calcium chloride was completely dissolved in the NMP.

After the temperature of the solution thus obtained was returned to ordinary temperature, 3.2 parts by weight of paraphenylenediamine was added to the solution and completely dissolved therein. Subsequently, a reaction bath that contains the solution containing paraphenylenediamine was placed in a constant temperature bath at 20° C. While the temperature is kept at 20° C., 5.8 parts by weight of terephthaloyl dichloride was dropped into the solution for duration of one hour to cause reaction, whereby polyparaphenylene terephthalamide (hereinafter referred to as PPTA) was obtained.

Thereafter, the solution containing PPTA was allowed to stand for one hour in a constant temperature bath at 20° C. After the reaction was completed, the solution containing PPTA was placed in a vacuum bath and then degassed for 30 minutes while stirred under reduced pressure.

Further, the polymerization solution thus obtained was diluted by an NMP solution to which calcium chloride was added, whereby an NMP solution of PPTA having a concentration of PPTA of 1.4 wt % was prepared.

The NMP solution of PPTA thus obtained was applied thinly on the porous thin film made of polyethylene with a doctor blade, and then dried with hot air of 80° C. (airflow rate: 0.5 m/sec). The PTAA film thus obtained was sufficiently washed with pure water to remove calcium chloride therefrom so that this film became porous, and then dried again. In such a manner, the laminated film comprising a porous thin film made of polyethylene and a porous film of PTAA formed thereon was fabricated.

The measurement of the content of residual chlorine in the laminated film by chemical analysis showed that the content of residual chlorine was 650 μg per 1 g of the laminated film.

(d) Preparation of Non-Aqueous Electrolyte $LiPF_6$ was dissolved at a concentration of 1 mol/L in a solvent mixture containing ethylene carbonate, dimethyl carbonate and ethyl methyl carbonate at a volume ratio of 2:3:3.

To the resultant solution, vinylene carbonate was added to prepare a non-aqueous electrolyte. The content of vinylene carbonate was 3 parts by weight per 100 parts by weight of the non-aqueous electrolyte.

(e) Fabrication of Battery

Figure 1:
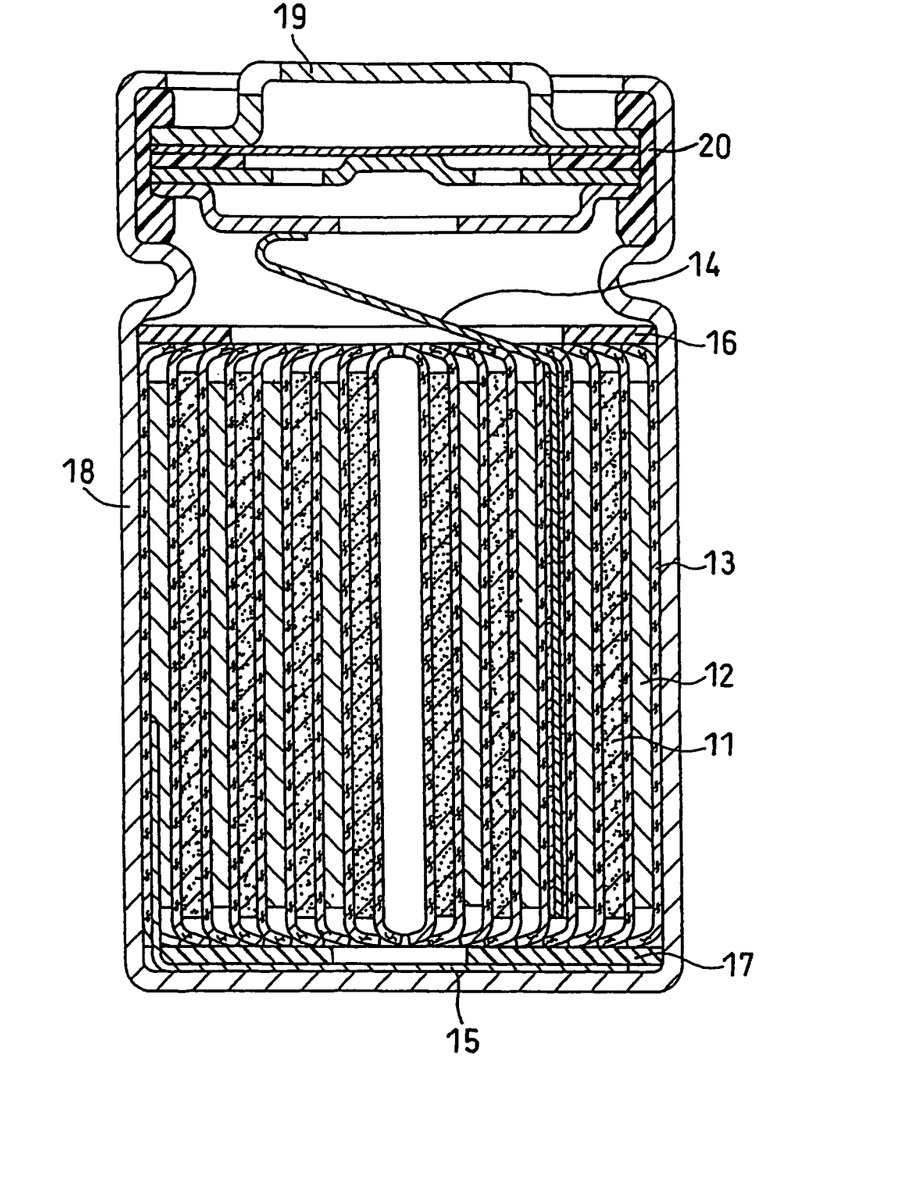
[FIG. 1] A vertical sectional view schematically illustrating a cylindrical lithium secondary battery fabricated in Example.

A cylindrical battery as shown in FIG. 1 was fabricated.

First, each of the positive electrode plate and the negative electrode plate obtained in the manner as described above was cut into a predetermined length to provide a positive electrode 11 and a negative electrode 12. To the positive electrode lead connecting portion of the positive electrode 11, one end of a positive electrode lead 14 was connected. To the negative electrode lead connecting portion of the negative electrode 12, one end of a negative electrode lead 12 was connected.

A separator 13 was interposed between the positive electrode 11 and the negative electrode 12 and the whole was wound to fabricate a cylindrical electrode assembly. At this time, the separator 13 was disposed between the positive electrode 11 and the negative electrode 12 such that the PTAA layer was arranged in the positive electrode side. The outermost part of the wound electrode was covered with the separator 13.

The electrode assembly thus obtained was sandwiched by an upper insulation ring 16 and a lower insulation ring 17, and the whole was housed in a battery can 18. Subsequently, 5 g of the above described non-aqueous electrolyte (not shown) was injected into the battery can 18. Thereafter, the pressure of interior of the battery can 18 was reduced to 133 Pa and left until the residual of non-aqueous electrolyte was not observed on the surface of the electrode assembly, whereby the non-aqueous electrolyte was impregnated into the electrode assembly.

Subsequently, the other end of the positive electrode lead 14 was welded to the back face of a battery lid 19 with an insulating packing 20 disposed on the periphery thereof; and the other end of the negative electrode lead 15 was welded to the bottom face of the interior of the battery can 18. Finally, the opening end of the battery can 18 was crimped onto the insulating packing 20 of the battery lid 19 to seal the opening of the battery can 18, whereby a cylindrical lithium ion secondary battery was finished. The battery thus fabricated was referred to as a battery of Example 1-1.

EXAMPLES 1-2 TO 1-4

Batteries were fabricated in the same manner as in Example 1-1 except that when synthesizing the precursor of the positive electrode active material, the concentration ratio of the cobalt sulfate to the aluminum sulfate was changed to 0.95:0.05, 0.80:0.20 or 0.75:0.25. The batteries thus obtained were referred to as batteries of Examples 1-2 to 1-4.

EXAMPLE 1-5

A battery was fabricated in the same manner as in Example 1-1 except that when the precursor of the positive electrode active material was synthesized, iron sulfate was further added and the concentration ratio of the cobalt sulfate, the iron sulfate and the aluminum sulfate was changed to 0.9:0.05:0.05. The battery thus fabricated was referred to as a battery of Example 1-5.

EXAMPLES 1-6 TO 1-9

Batteries were fabricated in the same manner as in Example 1-2 except that when synthesizing the positive electrode active material, the precursor of the positive electrode active material and the lithium carbonate were mixed such that the molar ratio of the lithium, the cobalt and the aluminum was 0.98:0.95:0.05, 1:0.95:0.05, 1.05:0.95:0.05 or 1.08:0.95:0.05. The batteries thus obtained were referred to as batteries of Examples 1-6 to 1-9.

EXAMPLE 1-10

A battery was fabricated in the same manner as in Example 1-2 except that a laminated film in which a film made of polyamideimide resin was formed on the porous thin film made of polyethylene in place of the PTAA film was used as the separator. The battery thus fabricated was referred to as a battery of Example 1-10.

A method of fabricating the laminated film comprising a porous thin film made of polyethylene and a film made of polyamideimide resin formed thereon will be described below.

Trimellitic anhydride monochloride and diamine were added to NMP at room temperature and mixed to give an NMP solution of polyamic acid. The resultant NMP solution was applied thinly onto a porous thin film made of polyethylene with a doctor blade. The coated film was dried with hot air of 80° C. (airflow rate: 0.5 m/sec) so that the polyamic acid was dehydrated and cyclized to be transformed into polyamideimide. The laminated film comprising a porous thin film made of polyethylene and a film made of polyamideimide formed thereon was thus fabricated. The total thickness of the laminated film was 20 μm.

The measurement of the content of residual chlorine in the laminated film by chemical analysis showed that the content of residual chlorine was 830 μg per 1 g of the laminated film.

EXAMPLE 1-11

A battery was fabricated in the same manner as in Example 1-2 except that a porous film made of aramid only was used as the separator. The battery thus fabricated was referred to as a battery of Example 1-11.

A method of fabricating the porous film made of aramid only will be described below.

A predetermined amount of aramid resin was dissolved in NMP in the manner as described above. Subsequently, the NMP solution was applied onto a smooth stainless steel plate with a doctor blade. The coated film thus obtained was dried with hot air of 80° C. (airflow rate: 0.5 m/sec) to provide a film made of aramid only. The thickness of the porous film was 20 μm.

The measurement of the content of residual chlorine in the porous film by chemical analysis showed that the content of residual chlorine was 1800 μg per 1 g of the porous film.

EXAMPLE 1-12

A battery was fabricated in the same manner as in Example 1-2 except that a laminated matter having a porous thin film made of polyethylene and a layer formed thereon that includes a filler and aramid resin was used as the separator. The battery thus fabricated was referred to as a battery of Example 1-12.

A method of fabricating the above laminated matter will be described below.

To the NMP solution of aramid resin as fabricated in the above described Example 1-1, alumina fine particles were added and stirred. The amount of alumina fine particles added was 200 parts by weight per 100 parts by weight of aramid resin contained in the NMP solution.

The dispersion thus obtained was thinly applied onto a porous thin film made of polyethylene with a doctor blade, then the coated film was dried with hot air of 80° C. (airflow rate: 0.5 m/sec). The laminated matter having a porous thin film made of polyethylene and a layer formed thereon that includes a filler and aramid was thus fabricated.

The measurement of the content of residual chlorine in the laminated matter by chemical analysis showed that the content of residual chlorine was 600 μg per 1 g of the separator.

COMPARATIVE EXAMPLE 1

A lithium-containing composite oxide was synthesized in the same manner as in Example 1-1 except that cobalt hydroxide was synthesized from cobalt sulfate only, and then lithium carbonate and the cobalt hydroxide were mixed so that the molar ratio of the lithium to the cobalt became 1.02:1. A battery was fabricated in the same manner as in Example 1-1 except that the lithium-containing composite oxide thus obtained was used as the positive electrode active material. The battery thus fabricated was referred to as a battery of Comparative Example 1.

COMPARATIVE EXAMPLE 2

A battery was fabricated in the same manner as in Example 1-2 except that a 20 μm thick porous film made of polyethylene was used as the separator. The battery thus fabricated was referred to as a battery of Comparative Example 2.

Each of the batteries thus obtained was subjected to a preparatory charge and discharge twice in which each battery was discharged at a constant current of 400 mA until the battery voltage was reduced to 3 V, and then charged at a constant current of 1400 mA until the battery voltage reached 4.2 V. Subsequently, the battery after charge was stored at 45° C. for seven days. The battery after storage was evaluated as follows.

[Evaluation]
(i) Measurement of discharge Capacity
The battery after storage was subjected to a first charge and discharge cycle once. In the first charge and discharge cycle, the battery was charged at 20° C. at a constant voltage of 4.2 V until the current value was decreased to 100 mA, and then the battery after charge was discharged at a constant current of 2000 mA until the battery voltage was reduced to 3 V. The discharge capacity at this time was referred to as an initial discharge capacity. The results are shown in Table 1.

(ii) Safety Test
The battery after storage was charged at 20° C. at a constant voltage of 4.2 V until the current value was decreased to 100 mA. Thereafter, the battery after charge was placed in a constant temperature bath at 130° C. to measure a maximum temperature of the surface of the battery. The results are shown in Table 1.

(iii) High Temperature Storage Characteristics
Firstly, the initial discharge capacity was measured in the manner as described above. Thereafter, the battery was charged at 20° C. at a constant voltage of 4.2 V until the current value was decreased to 100 mA. Then, the battery after charge was placed in a constant temperature bath at 90° C. and stored for 24 hours. The battery after storage was discharged at a constant current of 2000 mA to obtain a discharge capacity after storage. A proportion of the discharge capacity after storage to the initial discharge capacity was calculated as a percentage. This proportion was referred to as a capacity recovery rate. The results are shown in Table 1.

It is to be noted that Table 1 further shows the compositions of the positive electrode active materials and the types of separators, which were used in Examples and Comparative Examples.

TABLE 1

| | $Li_aCo_{1-b-c}Fe_bAl_cO_2$ | | | | | Initial discharge capacity (mAh) | Maximum temperature of the battery surface (° C.) | Capacity recovery rate (%) |
|---|---|---|---|---|---|---|---|---|
| | a | 1 − b − c | b | c | Separator | | | |
| Ex. 1-1 | 1.02 | 0.999 | 0 | 0.001 | Aramid + PE | 2050 | 142 | 66 |
| Ex. 1-2 | 1.02 | 0.95 | 0 | 0.05 | Aramid + PE | 2020 | 139 | 70 |
| Ex. 1-3 | 1.02 | 0.8 | 0 | 0.2 | Aramid + PE | 2000 | 140 | 71 |
| Ex. 1-4 | 1.02 | 0.75 | 0 | 0.25 | Aramid + PE | 1890 | 139 | 73 |
| Ex. 1-5 | 1.02 | 0.9 | 0.05 | 0.05 | Aramid + PE | 2015 | 141 | 72 |
| Ex. 1-6 | 0.98 | 0.95 | 0 | 0.05 | Aramid + PE | 1900 | 144 | 71 |
| Ex. 1-7 | 1 | 0.95 | 0 | 0.05 | Aramid + PE | 1950 | 143 | 70 |
| Ex. 1-8 | 1.05 | 0.95 | 0 | 0.05 | Aramid + PE | 1970 | 141 | 72 |
| Ex. 1-9 | 1.08 | 0.95 | 0 | 0.05 | Aramid + PE | 1880 | 142 | 70 |
| Ex. 1-10 | 1.02 | 0.95 | 0 | 0.05 | polyamide-imide + PE | 2020 | 144 | 69 |
| Ex. 1-11 | 1.02 | 0.95 | 0 | 0.05 | Aramid | 2020 | 137 | 72 |
| Ex. 1-12 | 1.02 | 0.95 | 0 | 0.05 | (Aramid + Filler) + PE | 2020 | 142 | 71 |
| Com. Ex. 1 | 1.02 | 1 | 0 | 0 | Aramid + PE | 2050 | 141 | 50 |
| Com. Ex. 2 | 1.02 | 0.95 | 0 | 0.05 | PE | 2020 | 156 | 72 |

As shown in Table 2, in the battery of Comparative Example 2 that does not include the heat resistant resin in the separator, the maximum temperature of the batter surface was raised to 156° C. This indicates that the safety of battery is reduced when the separator does not include the heat resistant resin.

As is evident form the result of Comparative Example 1, even when the separator includes the heat resistant resin, in the case where the positive electrode active material does not contain aluminum atoms, the capacity recovery rate is significantly reduced. It is conceivable that this is because the chlorine group contained in the heat resistant resin as an end group was liberated into the non-aqueous electrolyte under high temperature environment and accelerated the leaching of main component elements of the positive electrode active material (cobalt in the case of Comparative Example 1).

On the other hand, as is the case of batteries of Example 1-1 to 1-12, in the case where the separator including the heat resistant resin and the positive electrode active material containing aluminum atoms in its composition were used, both the safety under high temperature environment and the storage characteristics were favorable. It is conceivable that this was because since an aluminum atom in the positive electrode active material forms a stable complex ion with chlorine atoms liberated from aramid (or polyamideimide), the aluminum atoms were selectively leached from the positive electrode active material, making it possible to suppress the leaching of other component elements of the positive electrode active material. It is to be noted that such an effect is obtained also in the case where a positive electrode active material including a metal such as iron in addition to cobalt in its composition is used as is the case of the battery of Example 1-5.

As is shown in the results of Examples 1-1 to 1-4, the larger the content of the aluminum in the positive electrode active material is, the lower the maximum temperature of the battery is and the more the capacity recovery rate is improved. However, as shown in Example 1-4, the content of the aluminum is increased excessively, the proportion of the main component elements in the positive electrode active material is decreased, consequently reducing the initial discharge capacity.

Further, the results of Examples 1-2 and 1-6 to 1-8 indicate that when the content of the lithium in the positive electrode active material is too large or too small, the initial discharge capacity is reduced. It is conceivable that when the content of the lithium in the positive electrode active material is too small, the content of the impurities such as cobalt oxide that do not contribute to the battery capacity increases to reduce the battery capacity; and when the lithium content is too large, excessive amount of lithium remains as an impurity in the positive electrode active material to reduce the initial discharge capacity.

For this reason, in the lithium-containing composite oxide represented by $Li_xCo_{1-y}Al_yO_2$, it is preferable that $1 \leq x \leq 1.05$, and $0.001 \leq y \leq 0.2$.

Furthermore, the results of Examples 1-10 to 1-12 indicate that the effect as described above can also be obtained in the cases: where a laminated film comprising a porous thin film and a film including the heat resistant resin is used as the separator; where a porous film made of the heat resistant resin is used as the separator; and where a laminated matter having a porous thin film and a layer including a filler and aramid resin is used as the separator.

EXAMPLE 2

EXAMPLES 2-1 TO 2-12

Precursors 2-1 to 2-12 were synthesized in the same manner as in Example 1-1 except that when the precursor of the positive electrode active material was synthesized, magnesium sulfate was additionally added and the concentration ratio of the cobalt sulfate, the magnesium sulfate and the aluminum sulfate was changed as shown in Table 2. Then positive electrode active materials 2-1 to 2-12 were synthesized in the same manner as in Example 1-1 except that the mixing ratio of the precursors 2-1 to 2-12 thus obtained to the lithium carbonate was changed as shown in Table 2. These positive electrode active materials were used to fabricate batteries in the same manner as in Example 1-1. The batteries thus obtained were referred to as batteries of Examples 2-1 to 2-12.

Each of the batteries thus obtained was subjected to the same preparatory charge and discharge as in Example 1 twice. The battery after charge was stored at 45° C. for seven days. With respect to the battery after storage, an initial discharge capacity, a maximum temperature of the battery surface and a capacity recovery rate were measured in the same manner as in Example 1. The results are shown in Table 2.

(iv) Capacity Retention Rate

In the present Example, a capacity retention rate was further measured with respect to the battery after storage 45° C. for seven days. The capacity retention rate was measured as follows. With respect to the battery after storage, the above described first charge and discharge cycle was repeated 200 times. A proportion of the discharge capacity at the 200th cycle to the discharge capacity at the first cycle was calculated as a percentage. This proportion was referred to as the capacity retention rate. The results are shown in Table 2.

TABLE 2

|  | $Li_aCo_{1-b-c}Mg_bAl_cO_2$ | | | Initial discharge capacity | Maximum temperature of the battery surface | Capacity recovery rate | Capacity retention rate |
| --- | --- | --- | --- | --- | --- | --- | --- |
|  | a | 1 − b − c | b | c | (mAh) | (° C.) | (%) | (%) |
| Ex. 2-1 | 1.02 | 0.979 | 0.02 | 0.001 | 2050 | 143 | 67 | 88 |
| Ex. 2-2 | 1.02 | 0.93 | 0.02 | 0.05 | 2020 | 140 | 71 | 91 |
| Ex. 2-3 | 1.02 | 0.78 | 0.02 | 0.2 | 2000 | 142 | 73 | 92 |
| Ex. 2-4 | 1.02 | 0.77 | 0.02 | 0.21 | 1950 | 140 | 74 | 93 |
| Ex. 2-5 | 1.02 | 0.949 | 0.001 | 0.05 | 2015 | 142 | 73 | 80 |
| Ex. 2-6 | 1.02 | 0.945 | 0.005 | 0.05 | 1970 | 144 | 73 | 93 |
| Ex. 2-7 | 1.02 | 0.85 | 0.1 | 0.05 | 1950 | 144 | 71 | 92 |
| Ex. 2-8 | 1.02 | 0.8 | 0.15 | 0.05 | 1900 | 142 | 72 | 87 |
| Ex. 2-9 | 0.98 | 0.93 | 0.02 | 0.05 | 1946 | 141 | 72 | 91 |
| Ex. 2-10 | 1 | 0.93 | 0.02 | 0.05 | 1999 | 141 | 73 | 93 |
| Ex. 2-11 | 1.05 | 0.93 | 0.02 | 0.05 | 1999 | 142 | 73 | 92 |
| Ex. 2-12 | 1.08 | 0.93 | 0.02 | 0.05 | 1946 | 142 | 73 | 91 |

In table 2, the capacity retention rate of each battery is 80% or more. This indicates that the inclusion of magnesium in the positive electrode active material mitigates expansion and contraction of the positive electrode active material associated with charge and discharge, and thus suppresses the reduction in the discharge capacity.

The results of Examples 2-2 and 2-5 to 2-8 show that the higher the molar ratio b of the magnesium in the positive electrode active material is, the more the capacity retention rate is improved. However, in the case of Example 2-5 in which the molar ratio b is 0.001, the capacity retention rate is 80%, indicating that sufficient cycle characteristics cannot be obtained.

On the other hand, when the molar ratio b of the magnesium is increased, the proportion of the main component elements in the positive electrode active material is decreased, and thus the initial discharge capacity tends to be reduced. In other words, in the case of Example 2-8, in which the molar ratio b is 0.15, a sufficient initial discharge capacity cannot be obtained.

Further, as shown in Examples 2-1 to 2-4 and Examples 2-9 to 2-12, the same tendency as in Example 1 is observed with respect to the aluminum content and the lithium content.

For this reason, in the lithium-containing composite oxide represented by $Li_aCo_{1-b-c}Mg_bAl_cO_2$, it is preferable that $1 \leq a \leq 1.05$, $0.005 \leq b \leq 0.1$, and $0.001 \leq c \leq 0.2$.

EXAMPLE 3

EXAMPLES 3-1 TO 12

Precursors 3-1 to 3-12 were synthesized in the same manner as in Example 1-1 except that when the precursor of the positive electrode active material was synthesized, nickel sulfate, cobalt sulfate and aluminum sulfate were used and the concentration ratio of these was changed as shown in Table 3. Then positive electrode active materials 3-1 to 3-12 were synthesized in the same manner as in Example 1-1 except that the mixing ratio of the precursors 3-1 to 3-12 thus obtained to the lithium carbonate was changed as shown in Table 3. These positive electrode active materials were used to fabricate batteries in the same manner as in Example 1-1. The batteries thus obtained were referred to as batteries of Examples 3-1 to 3-12.

Each of the batteries thus obtained was subjected to the same preparatory charge and discharge as in Example 1 twice. The battery after charge was stored at 45° C. for seven days. With respect to the battery after storage, an initial discharge capacity, a maximum temperature of the battery surface, a capacity recovery rate and a capacity retention rate were measured in the same manner as in Example 2. The results are shown in Table 3.

The results of Table 3 indicate that when the positive electrode active material includes nickel and cobalt and the content of the nickel is large, the initial discharge capacity and the capacity retention ratio are improved.

Moreover, the results of Examples 3-5 and 3-8 indicate that the larger the content of the nickel contained in the positive electrode active material is, that is, the smaller the content of the cobalt is, the more the initial discharge capacity is improved. However, in the case of Example 3-8, in which the molar ratio b of the cobalt is 0.45, a sufficient initial discharge capacity may not be obtained.

Further, in the case of Example 3-5, in which the molar ratio b of the cobalt is 0.005, the capacity retention rate was reduced to some extent. It is conceivable that this is because expansion and contraction of the positive electrode active material associated with charge and discharge are not sufficiently mitigated.

Further, as shown in Examples 3-1 to 3-4 and Examples 3-9 to 3-12, the same tendency as in Example 1 is observed with respect to the aluminum content and the lithium content.

For this reason, in the lithium-containing composite oxide represented by $Li_aNi_{1-b-c}Co_bAl_cO_2$, it is preferable that $1 \leq a \leq 1.05$, $0.1 \leq b \leq 0.35$, and $0.001 \leq c \leq 0.2$.

EXAMPLE 4

EXAMPLES 4-1 TO 19

Precursors 4-1 to 4-19 were synthesized in the same manner as in Example 1-1 except that when the precursor of the positive electrode active material was synthesized, nickel sulfate, manganese sulfate, cobalt sulfate and aluminum sulfate were used and the concentration ratio of these was changed as shown in Table 4. Then positive electrode active materials 4-1 and 4-19 were synthesized in the same manner as in Example 1-1 except that the mixing ratio of the precursors 4-1 to 4-19 thus obtained to the lithium carbonate was changed as shown in Table 4. These positive electrode active materials were used to fabricate batteries in the same manner as in Example 1-1. The batteries thus obtained were referred to as batteries of Examples 4-1 to 4-19.

Each of the batteries thus obtained was subjected to the same preparatory charge and discharge as in Example 1 twice.

TABLE 3

| | $Li_aCo_{1-b-c}Co_bAl_cO_2$ | | | Initial discharge capacity | Maximum temperature of the battery surface | Capacity recovery rate | Capacity retention rate |
|---|---|---|---|---|---|---|---|
| | a | 1 − b − c | b | c | (mAh) | (° C.) | (%) | (%) |
| Ex. 3-1 | 1.01 | 0.849 | 0.15 | 0.001 | 2250 | 144 | 48 | 87 |
| Ex. 3-2 | 1.01 | 0.8 | 0.15 | 0.05 | 2100 | 141 | 77 | 88 |
| Ex. 3-3 | 1.01 | 0.65 | 0.15 | 0.2 | 2069 | 142 | 83 | 89 |
| Ex. 3-4 | 1.01 | 0.64 | 0.15 | 0.21 | 2030 | 141 | 85 | 91 |
| Ex. 3-5 | 1.01 | 0.945 | 0.005 | 0.05 | 2350 | 143 | 73 | 81 |
| Ex. 3-6 | 1.01 | 0.85 | 0.1 | 0.05 | 2150 | 145 | 74 | 87 |
| Ex. 3-7 | 1.01 | 0.6 | 0.35 | 0.05 | 2100 | 145 | 73 | 91 |
| Ex. 3-8 | 1.01 | 0.5 | 0.45 | 0.05 | 1950 | 143 | 74 | 93 |
| Ex. 3-9 | 0.98 | 0.8 | 0.15 | 0.05 | 2009 | 141 | 82 | 87 |
| Ex. 3-10 | 1 | 0.8 | 0.15 | 0.05 | 2082 | 142 | 83 | 88 |
| Ex. 3-11 | 1.05 | 0.8 | 0.15 | 0.05 | 2054 | 142 | 84 | 89 |
| Ex. 3-12 | 1.08 | 0.8 | 0.15 | 0.05 | 1917 | 141 | 81 | 88 |

The battery after charge was stored at 45° C. for seven days. With respect to the battery after storage, an initial discharge capacity, a maximum temperature of the battery surface and a capacity recovery rate were measured in the same manner as in Example 1. The results are shown in Table 4.

It is to be noted that Table 4 further shows the values of b+c+d.

TABLE 4

| | $Li_aNi_{1-(b+c+d)}Mn_bCo_cAl_dO_2$ | | | | | Initial discharge capacity (mAh) | Maximum temperature of the battery surface (° C.) | Capacity recovery rate (%) |
|---|---|---|---|---|---|---|---|---|
| | a | 1 − (b + c + d) | b | c | d | b + c + d | | | |
| Ex. 4-1 | 1.01 | 0.339 | 0.33 | 0.33 | 0.001 | 0.661 | 1890 | 141 | 69 |
| Ex. 4-2 | 1.01 | 0.31 | 0.32 | 0.32 | 0.05 | 0.69 | 1862 | 138 | 73 |
| Ex. 4-3 | 1.01 | 0.26 | 0.27 | 0.27 | 0.2 | 0.74 | 1710 | 139 | 74 |
| Ex. 4-4 | 1.01 | 0.27 | 0.26 | 0.26 | 0.21 | 0.73 | 1690 | 138 | 76 |
| Ex. 4-5 | 1.01 | 0.44 | 0.19 | 0.32 | 0.05 | 0.56 | 1950 | 141 | 72 |
| Ex. 4-6 | 1.01 | 0.19 | 0.57 | 0.19 | 0.05 | 0.81 | 1650 | 143 | 73 |
| Ex. 4-7 | 0.98 | 0.31 | 0.32 | 0.32 | 0.05 | 0.69 | 1781 | 137 | 74 |
| Ex. 4-8 | 1 | 0.31 | 0.32 | 0.32 | 0.05 | 0.69 | 1846 | 137 | 73 |
| Ex. 4-9 | 1.05 | 0.31 | 0.32 | 0.32 | 0.05 | 0.69 | 1822 | 137 | 72 |
| Ex. 4-10 | 1.08 | 0.31 | 0.32 | 0.32 | 0.05 | 0.69 | 1700 | 138 | 73 |
| Ex. 4-11 | 1.01 | 0.85 | 0.05 | 0.05 | 0.05 | 0.15 | 2100 | 148 | 76 |
| Ex. 4-12 | 1.01 | 0.75 | 0.10 | 0.10 | 0.05 | 0.25 | 1972 | 143 | 75 |
| Ex. 4-13 | 1.01 | 0.5 | 0.20 | 0.25 | 0.05 | 0.5 | 1930 | 142 | 73 |
| Ex. 4-14 | 1.01 | 0.25 | 0.50 | 0.20 | 0.05 | 0.75 | 1700 | 139 | 72 |
| Ex. 4-15 | 1.01 | 0.25 | 0.20 | 0.50 | 0.05 | 0.75 | 1750 | 140 | 71 |
| Ex. 4-16 | 1.01 | 0.25 | 0.60 | 0.10 | 0.05 | 0.75 | 1630 | 138 | 71 |
| Ex. 4-17 | 1.01 | 0.25 | 0.10 | 0.60 | 0.05 | 0.75 | 1695 | 141 | 73 |
| Ex. 4-18 | 1.01 | 0.15 | 0.60 | 0.20 | 0.05 | 0.85 | 1620 | 137 | 72 |
| Ex. 4-19 | 1.01 | 0.15 | 0.20 | 0.60 | 0.05 | 0.85 | 1640 | 142 | 72 |

When the positive electrode active material contains manganese in addition to nickel and cobalt, an inexpensive positive electrode active material can be obtained, while the stable battery performances are maintained. In order to achieve cost reduction, a certain amount or more of manganese is needed. In the case of Example 4-1, in which the molar ratio b of the manganese is 0.05, the maximum temperature of the battery surface is increased and the safety of battery is decreased to some extent. In the case of Examples 4-16 and 4-18 in which the molar ratio b of the manganese is 0.6, the initial discharge capacity is reduced.

Moreover, as is evident from Example 4-11, when the molar ratio c of the cobalt is 0.05, the maximum temperature of the battery surface is increased. In the case of Examples 4-17 and 4-19, in which the molar ratio c of the cobalt is 0.6, the initial discharge capacity is reduced.

Further, as shown in Examples 4-1 to 4-4 and Examples 4-7 to 4-10, the same tendency as in Example 1 is observed with respect to the aluminum content and the lithium content.

For this reason, in the lithium-containing composite oxide represented by $Li_aNi_{1-(b+c+d)}Mn_bCo_cAl_dO_2$, it is preferable that $1 \leq a \leq 1.05$, $0.1 \leq b \leq 0.5$, $0.1 \leq c \leq 0.5$ and $0.001 \leq d \leq 0.2$.

In addition, in Examples 4-18 and 4-19, in which b+c+d was 0.85, it was observed that the initial discharge capacity tended to be reduced. In Example 4-11, in which b+c+d was 0.15, it was observed that the maximum temperature of the battery surface tended to be increased and the safety of battery tended to be reduced to some extent. This indicates therefore that when $0.2 \leq b+c+d \leq 0.75$, a battery in which the above three characteristics are well balanced can be obtained.

In the below described Examples, battery performances were evaluated in the cases: where a mixture of a plurality of lithium-containing composite oxides was used as the positive electrode active material; where the positive electrode active material was exposed under high voltage environment; and where the type of negative electrode active material was changed.

EXAMPLE 5

EXAMPLE 5-1

50 parts by weight of the positive electrode active material ($Li_{1.02}Co_{0.95}Al_{0.05}O_2$) as used in Example 1-2 and 50 parts by weight of the positive electrode active material ($Li_{1.01}Ni_{0.32}Mn_{0.32}Co_{0.32}Al_{0.05}O_2$) as used in Example 4-2 were mixed to give powder as a positive electrode active material 5-1. A battery was fabricated in the same manner as in Example 1-1 except that this positive electrode active material was used. The battery thus obtained was referred to as a battery of Example 5-1.

EXAMPLE 5-2

A battery was fabricated in the same manner as in Example 1-2 except that the density of the positive electrode active material in the positive electrode material mixture layer was changed to 3.3 g/cm³ and the thickness of the positive electrode plate was changed to 144 μm. The battery thus obtained was referred to as a battery of Example 5-2.

EXAMPLE 5-3

A battery was fabricated in the same manner as in Example 4-2 except that the density of the positive electrode active material in the positive electrode material mixture layer was changed to 3.3 g/cm$^3$ and the thickness of the positive electrode plate was changed to 144 µm. The battery thus obtained was referred to as a battery of Example 5-3.

EXAMPLE 5-4

In a double arm kneader, 3 kg of elementary silicon (Si) powder (median diameter: 10 µm) as a negative electrode active material, 750 g of an aqueous dispersion containing 40 wt % modified styrene-butadiene rubber particles (BM-400B (trade name) available from Zeon Corporation, Japan) as a binder, 600 g of acetylene black as a conductive agent, 300 g of carboxymethyl cellulose as a thickener and an appropriate amount of water as a dispersion medium were stirred to prepare a negative electrode material mixture paste. The negative electrode material mixture paste was applied onto both faces of a 10 µm thick band-shaped negative electrode current collector made of copper foil. The negative electrode material mixture paste thus applied was dried and rolled with a roll to give a negative electrode plate. A battery was fabricated in the same manner as in Example 3-2 except that this negative electrode plate was used. The battery thus obtained was referred to as a battery of Example 5-4.

EXAMPLE 5-5

A battery was fabricated in the same manner as in Example 5-4 except that SiO powder (median diameter: 8 µm) was used in place of the silicon powder and the dimensions of the positive electrode and the negative electrode were changed as appropriate. The battery thus obtained was referred to as a battery of Example 5-5.

EXAMPLE 5-6

A vacuum vapor deposition device including a vacuum chamber with water-cooled roller disposed therein was used to fabricate a negative electrode as described below.

An electrolytic Cu foil (available from FURUKAWA CIRCUIT FOIL Co., Ltd., thickness: 20 µm) serving as a current collector was adhered and fixed on the water-cooled roller in the vacuum vapor deposition device. Beneath the roller, a crucible made of graphite in which silicon (available from Furuuchi Chemical Corporation, ingot with purity of 99.999%) was placed therein was located. A nozzle was installed in the vacuum chamber so that oxygen gas could be introduced between the crucible and the Cu foil. The flow rate of the oxygen gas (available from NIPPON SANSO CORPORATION, purity: 99.7%) from the nozzle was set to 20 sccm (20 cm$^3$ flow per minute). In order to prevent excessive attachment of silicon, a shield plate made of stainless steel having an opening was located between the crucible and the water-cooled roller. The width of this opening was 10 mm in the rotation direction of the rollers. On the opening of the shield plate, a shutter was located in order to prevent evaporation and adhesion before an evaporating temperature is reached.

An electron gun was used to vapor-deposit silicon on the current collector. The acceleration voltage of the electron beam was set to −8 kV, and the emission of the electron beam was set to 150 mA.

The degree of vacuum in the vacuum chamber was 1.5× 10$^{-1}$ Pa and the water-cooled roller was rotated at a speed of 10 cm/min. The surface temperature of the water-cooled roller was set to 20° C.

One face of the current collector was coated with an active material including silicon and oxygen by vapor deposition and then the other face was coated with the active material in the same manner. Thus, a negative electrode carrying a thin film composed of the active material on both faces of the current collector was fabricated.

The composition of the negative electrode active material was quantified by elementary analysis. The results showed that the composition of the negative electrode active material was $SiO_{0.6}$.

A battery was fabricated in the same manner as in Example 5-4 except that the negative electrode thus obtained was used and the dimensions of the positive electrode and the negative electrode were changed as appropriate. The battery thus fabricated was referred to as a battery of Example 5-6.

Each of the batteries of Examples 5-1 and 5-4 to 5-6 was subjected to the same preparatory charge and discharge as in Example 1 twice. The battery after charge was stored at 45° C. for seven days. With respect to the battery after storage, an initial discharge capacity, a maximum temperature of the battery surface and a capacity recovery rate were measured in the same manner as in Example 1. The results are shown in Table 5.

Each of the batteries of Example 5-2 and 5-3 was subjected to the same preparatory charge and discharge as in Example 1 twice except that the end-of-charge voltage was changed to 4.4 V. The battery after charge was stored at 45° C. for seven days. Subsequently, the battery after storage was evaluated as follows.

(v) Measurement of Discharge Capacity

The battery after storage was charged at 20° C. at a constant voltage of 4.4 V until the current value was decreased to 100 mA. Thereafter, the battery after charge was discharged at a constant current of 2000 mA until the battery voltage was reduced to 3 V to obtain an initial discharge capacity. The results are shown in Table 5.

(vi) Safety Test

The battery after storage was charged at 20° C. at a constant voltage of 4.4 V until the current value was decreased to 100 mA. Thereafter, the battery after charge was placed in a constant temperature bath at 130° C. to measure a maximum temperature of the battery surface. The results are shown in Table 5.

(vii) High Temperature Storage Characteristics

First, the initial discharge capacity was measured in the manner as described above. Thereafter, the battery was charged at 20° C. at a constant voltage of 4.4 V until the current value was decreased to 100 mA. Subsequently, the battery after charge was placed in a constant temperature bath at 90° C. and stored for 24 hours. The battery after storage was discharged at a constant current of 2000 mA to obtain a discharge capacity after storage. A proportion of the discharge capacity after storage to the initial discharge capacity was calculated as a percentage. This proportion was referred to as a capacity recovery rate. The results are shown in Table 5.

TABLE 5

|  | Positive electrode active material | Negative electrode active material | Charge voltage (V) | Initial discharge capacity (mAh) | Maximum temperature of the battery surface (° C.) | Capacity recovery rate (%) |
|---|---|---|---|---|---|---|
| Ex. 5-1 | $Li_{1.02}Co_{0.95}Al_{0.05}O_2$ + $Li_{1.01}Ni_{0.32}Mn_{0.32}Co_{0.32}Al_{0.05}O_2$ | Artificial graphite | 4.2 | 1941 | 138 | 72 |
| Ex. 5-2 | $Li_{1.02}Co_{0.95}Al_{0.05}O_2$ | Artificial graphite | 4.2 | 2222 | 141 | 66 |
| Ex. 5-3 | $Li_{1.01}Ni_{0.32}Mn_{0.32}Co_{0.32}Al_{0.05}O_2$ | Artificial graphite | 4.4 | 2048 | 139 | 67 |
| Ex. 5-4 | $Li_{1.01}Ni_{0.8}Co_{0.15}Al_{0.05}O_2$ | Silicon | 4.2 | 2310 | 140 | 70 |
| Ex. 5-5 | $Li_{1.01}Ni_{0.8}Co_{0.15}Al_{0.05}O_2$ | SiO | 4.2 | 2373 | 140 | 72 |
| Ex. 5-6 | $Li_{1.01}Ni_{0.8}Co_{0.15}Al_{0.05}O_2$ | $SiO_{0.6}$ | 4.2 | 2394 | 138 | 74 |

As shown in Table 5, each of the batteries of Examples demonstrated excellence in the initial discharge capacity and the capacity recovery rate, and the maximum temperature of the battery surface thereof was not so high. This indicates that a battery excellent in safety and high temperature storage characteristics can be obtained in the cases: where a mixture including two types of lithium-containing composite oxide is used as the positive electrode active material (Example 5-1); where the positive electrode active material is exposed under high voltage environment (Examples 5-2 to 5-3); and where a negative electrode having a high capacity is used (Examples 5-4 to 5-6).

Industrial Applicability

According to the present invention, since the positive electrode active material includes an appropriate amount of aluminum, it is possible to suppress the leaching of main component elements of the positive electrode active material into the non-aqueous electrolyte if chlorine atoms contained as an end group in the heat resistant resin that is included in the separator are liberated into the non-aqueous electrolyte. As a result, a non-aqueous electrolyte secondary battery having excellent safety and improved high temperature storage characteristics can be obtained. Such a battery can be used as a power source for equipment that is required to have excellent battery performances even under high temperature environment.

The invention claimed is:

1. A non-aqueous electrolyte secondary battery comprising a positive electrode including a positive electrode active material, a negative electrode including a negative electrode active material, a non-aqueous electrolyte, and a separator, wherein said separator comprises a first porous film including a heat resistant resin having chlorine atoms only as an end group, wherein the separator is fabricated by applying a solution comprising the heat resistant resin dissolved in a polar solvent onto a second porous film, and then drying, said positive electrode active material comprises a lithium-containing composite oxide containing aluminum atoms in the composition thereof, and said lithium-containing composite oxide is represented by a following formula:

$$Li_xM_{1-y}Al_yO_2 \qquad (1)$$

where $1 \leq x \leq 1.05$, $0.001 \leq y \leq 0.2$, and M is at least one selected from the group consisting of Co, Ni, Mn and Mg, said heat resistant resin comprises at least one selected from the group consisting of aramid and polyamideimide, and an amount of chlorine included in said separator is 300 to 3000 μg per 1 g of said separator.

2. The non-aqueous electrolyte secondary battery in accordance with claim 1, wherein said separator comprises the first porous film laminated on the second porous film and the second porous film comprises a polyolefin.

3. The non-aqueous electrolyte secondary battery in accordance with claim 1, wherein said second porous film comprises a polyolefin and said first porous film further comprises a filler.

4. The non-aqueous electrolyte secondary battery in accordance with claim 1, wherein said lithium-containing composite oxide is represented by a following formula:

$$Li_aCo_{1-b-c}Mg_bAl_cO_2 \qquad (2)$$

where $1 \leq a \leq 1.05$, $0.005 \leq b \leq 0.1$, and $0.001 \leq c \leq 0.2$.

5. The non-aqueous electrolyte secondary battery in accordance with claim 1, wherein said lithium-containing composite oxide is represented by a following formula:

$$Li_aNi_{1-b-c}Co_bAl_cO_2 \qquad (3)$$

where $1 \leq a \leq 1.05$, $0.1 \leq b \leq 0.35$, and $0.001 \leq c \leq 0.2$.

6. The non-aqueous electrolyte secondary battery in accordance with claim 1, wherein said lithium-containing composite oxide is represented by a following formula:

$$Li_aNi_{1-(b+c+d)}Mn_bCo_cAl_dO_2 \qquad (4)$$

where $1 \leq a \leq 1.05$, $0.1 \leq b \leq 0.5$, $0.1 \leq c \leq 0.5$, $0.001 \leq d \leq 0.2$, and $0.2 \leq b+c+d \leq 0.75$.

7. The non-aqueous electrolyte secondary battery in accordance with claim 1, wherein the heat distortion temperature of said heat resistant resin determined by a load deflection temperature measurement at 1.82 MPa is 260° C. or more.

8. The non-aqueous electrolyte secondary battery in accordance with claim 1, wherein the amount of chlorine included in said separator is 600 to 1800 μg per 1 g of said separator.

9. The non-aqueous electrolyte secondary battery in accordance with claim 1, wherein said heat resistant resin is aramid obtained by polymerizing paraphenylenediamine and terephthaloyl dichloride, and the amount of chlorine included in said separator is an amount of chlorine atoms contained in said aramid as an end group.

10. The non-aqueous electrolyte secondary battery in accordance with claim 1, wherein said heat resistant resin is polyamideimide obtained by dehydrating and cyclizing a polyamic acid obtained by polymerizing trimellitic anhydride monochloride and diamine, and the amount of chlorine included in said separator is an amount of chlorine atoms contained in said polyamideimide as an end group.

11. The non-aqueous electrolyte secondary battery in accordance with claim 1, wherein said negative electrode active material comprises at least one selected from the group consisting of materials capable of forming an alloy with lithium, graphites, and silicon-based composite materials.

* * * * *